United States Patent [19]

Olson

[11] 4,436,713

[45] Mar. 13, 1984

[54] METHOD OF REMOVING HYDROGEN SULFIDE FROM GASES UTILIZING A POLYVALENT METAL CHELATE OF NITRILOTRIACETIC ACID AND REGENERATING THE SOLUTION IN A FUEL CELL

[75] Inventor: Donald C. Olson, Houston, Tex.

[73] Assignee: Shell Oil Company, Houston, Tex.

[21] Appl. No.: 430,466

[22] Filed: Sep. 30, 1982

[51] Int. Cl.³ ...................... C01B 17/04; B01D 53/34
[52] U.S. Cl. ................... 423/573 G; 423/224; 423/226; 204/129; 204/130; 204/131; 429/17; 429/27
[58] Field of Search ............... 423/224, 226, 573.6, 423/573 R; 204/129–131; 429/17, 27

[56] References Cited

U.S. PATENT DOCUMENTS

| | | | |
|---|---|---|---|
| 1,034,646 | 8/1912 | Rabenalt | 423/573 |
| 2,819,950 | 1/1958 | Patton | 423/573 |
| 3,068,065 | 12/1962 | Hartley et al. | 423/228 |
| 3,580,950 | 5/1971 | Bersworth | 562/565 |
| 3,765,946 | 10/1973 | Werner et al. | 429/13 |
| 4,091,073 | 5/1978 | Winkler | 423/226 |

*Primary Examiner*—Earl C. Thomas
*Attorney, Agent, or Firm*—Albert J. Adamcik

[57] ABSTRACT

A process for the removal of $H_2S$ from sour gas streams is described, the process being characterized by the utilization of washing solutions containing oxidizing polyvalent metal chelates of nitrilotriacetic acid, and by the regeneration of the spent solutions in a fuel cell mode.

6 Claims, 3 Drawing Figures

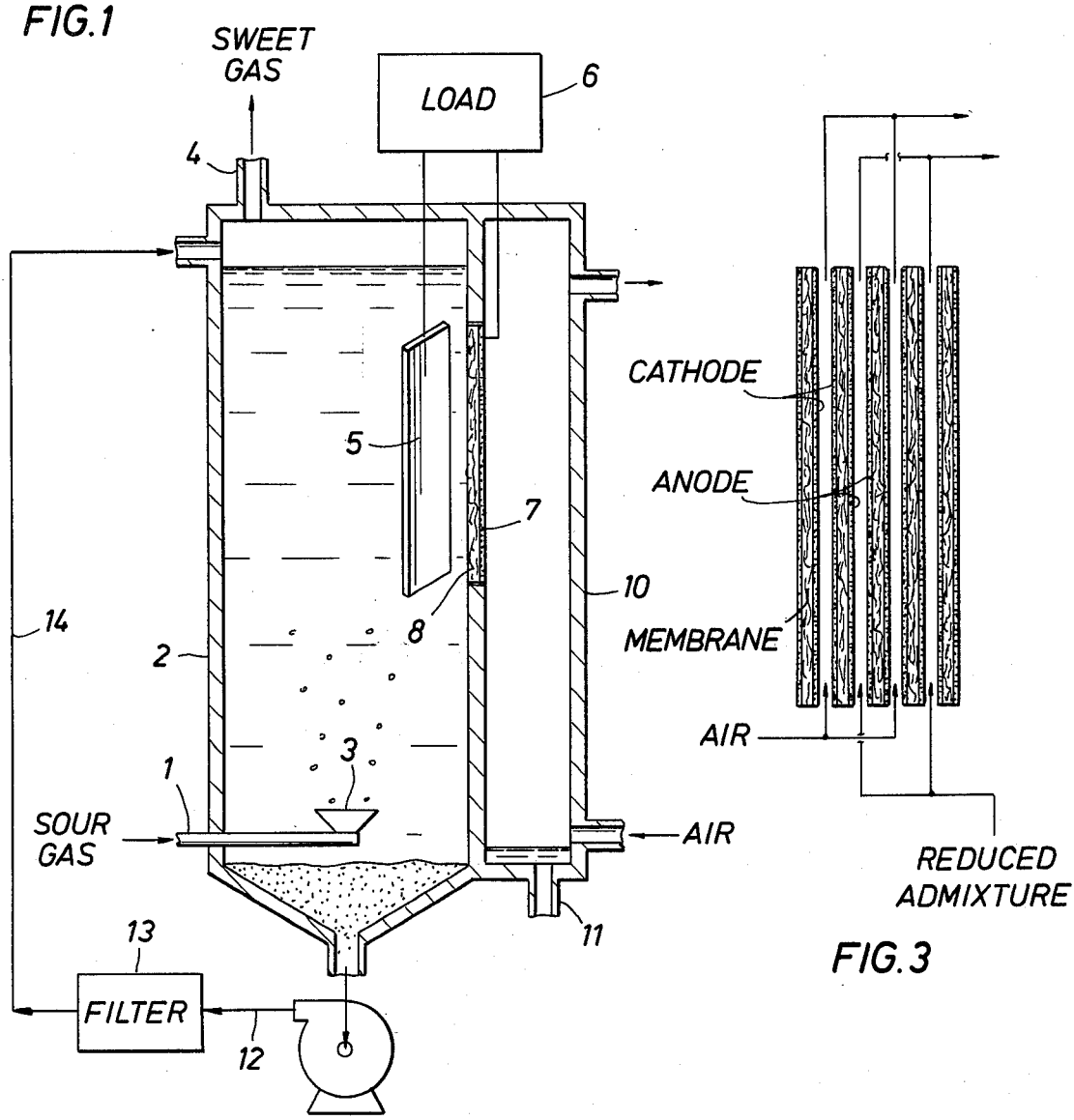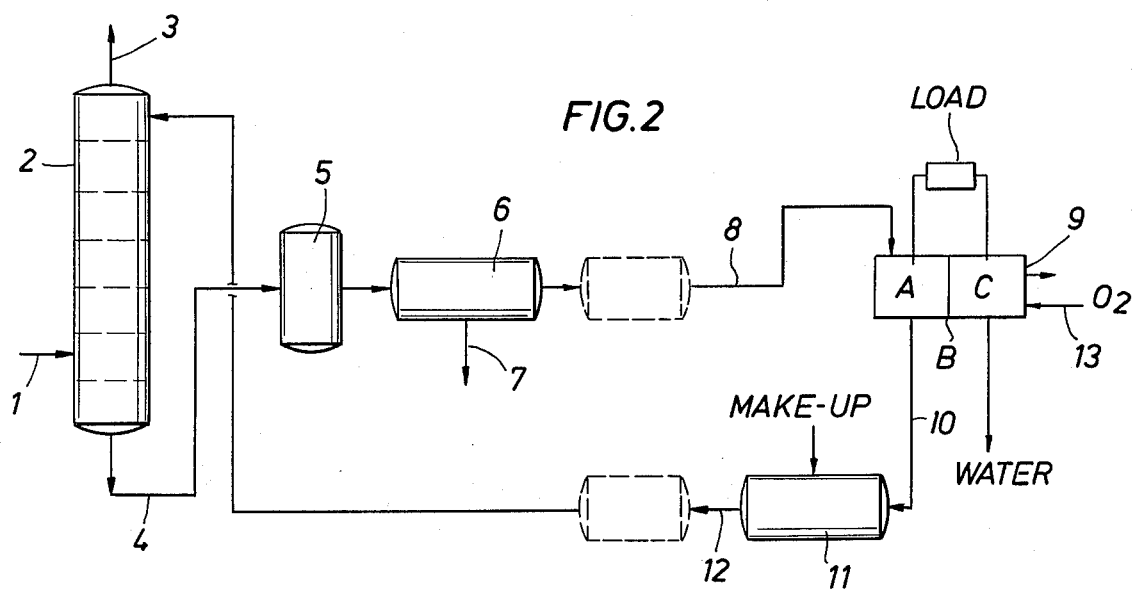

METHOD OF REMOVING HYDROGEN SULFIDE FROM GASES UTILIZING A POLYVALENT METAL CHELATE OF NITRILOTRIACETIC ACID AND REGENERATING THE SOLUTION IN A FUEL CELL

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which iron forms chelates with specified organic ligands.

In yet another process, e.g., that disclosed in U.S. Pat. No. 4,231,226 issued May 23, 1978, to Winkler, $CO_2$ present in the gaseous stream is also removed by the use of a suitable selective absorbent.

Because these "cleanup" processes generally represent significant costs to manufacturing operations, any improvements in such processes which increase their efficiency may have great economic importance. For example, where ligands or chelates of polyvalent metals are employed, chemical degradation or decomposition of the ligand represents an important cost in the process, as well as requiring measures for decomposition bleed or removal and addition of fresh solution. Even in the case of a chelate such as that of nitrilotriacetic acid, ligand decomposition, over a period of time, requires attention to prevent build-up of decomposition products and consequent loss of efficiency.

Evidence exists that degradation of the ligand in such processes may be caused by or enhanced by regeneration of the reduced form of the chelated metal with oxygen or an oxygen-containing gas. The invention avoids this problem, and regenerates the ligand in a novel and efficient manner.

SUMMARY OF THE INVENTION

Accordingly, the invention relates to a process for the removal of $H_2S$ from a sour gaseous stream comprising contacting the sour gaseous stream in a contacting zone with an aqueous reaction solution or mixture at a temperature below the melting point of sulfur, the aqueous reaction solution or mixture comprising an effective amount of an oxidizing polyvalent metal chelate of nitrilotriacetic acid, or mixtures thereof, producing a reactant admixture containing sulfur and reduced polyvalent metal chelate or chelates of nitrilotriacetic acid, and mixtures thereof, and regenerating the reactant admixture in a fuel cell mode, as hereinafter described. A sweet gas stream is produced and elemental sulfur may be recovered. In one embodiment, the regeneration may be carried out directly in the contacting zone, while in a preferred embodiment, an aqueous admixture containing sulfur and reduced polyvalent metal chelate or chelates of nitrilotriacetic acid is removed from the contact zone and electrochemically, as herein specified, regenerated in a separate zone. At least a portion of the sulfur crystals may be removed before regenerating the reduced reactant (preferred), or at least a portion of the sulfur crystals may be removed after regeneration.

In another embodiment of the invention, a sour gaseous stream containing $H_2S$ and $CO_2$ is contacted with a selective absorbent-aqueous reactant mixture at a temperature below the melting point of sulfur, the reactant mixture and procedure being similar to that described, supra. Broadly, this is accomplished by the use of an absorbent mixture containing a selective absorbent for $CO_2$ (and preferably for $H_2S$, as well), and an effective amount of an oxidizing polyvalent metal chelate or mixtures of chelates of nitrilotriacetic acid. A purified or "sweet" gaseous stream is produced which meets general industrial and commercial $H_2S$ and $CO_2$ specifications. The $CO_2$ is absorbed and the $H_2S$ is immediately converted to sulfur by the oxidizing polyvalent metal chelate or chelates. In the process, the oxidizing polyvalent metal chelate or chelates are reduced, and the sulfur may be treated, as described, supra. The sulfur crystals may be removed prior or subsequent to regeneration of the admixture.

The invention also provides, in this embodiment, for the regeneration of the reactant admixture and the absorbent. Preferably, the loaded absorbent mixture containing the reduced polyvalent metal chelate or chelates is regenerated in an electrolytic regeneration zone or zones, as described. The reactant-containing solution is treated, prior or subsequent to electrolytic regeneration, such as by heating or pressure reduction, to remove the $CO_2$ (either prior or subsequent to sulfur removal).

As indicated, a key feature of the invention lies in the manner in which the regeneration of the reduced polyvalent metal chelate or chelates of nitrilotriacetic acid is carried out. In the first embodiment mentioned, a suitable electrode or electrodes are maintained in the solution or admixture in the contacting zone, preferably at some finite distance from the site of the introduction of the $H_2S$, an external electrical connection is provided, through a load, to another electrode or electrodes separate from the contacting zone, allowance is made for passage of hydrogen ion from the contacting zone to the second electrode or electrodes, oxygen is provided to the second electrode or electrodes, and the regeneration "cell" is operated as a fuel cell. The reaction may be shown, in the case of iron, for example, as follows:

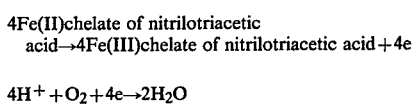

This overall cell reaction has a negative free energy. Assuming that an adequate current density, for example, from about 100 to about 200 amperes/square ft of electrode surface can be achieved without excessive overpotentials, the cell provides useful work through the load. Protons are provided in the system by the reaction of the $H_2S$ with the Fe(III) chelate, as shown by the following reaction:

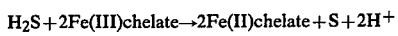

The $H_2S$ removal and regeneration may be carried out continuously.

Preferably, however, the solution or admixture containing reduced polyvalent metal chelate or chelates is removed from the contacting zone, sulfur is removed, and the reduced polyvalent metal chelate or chelates are oxidized by passing the admixture through the anode section of a electrochemical cell. The electrode or electrodes of such anode section are connected, through an external electrical connection or load, to an electrode or electrodes (cathode section) which are separated from the anode section by a barrier which, however, is permeable to hydrogen ion. Oxygen is supplied continuously to the cathode section. The cell, accordingly, at the anode, oxidizes the reduced polyvalent metal chelate or chelates to the oxidized or higher valence metal chelate or chelates, and, at the anode, converts hydrogen ion, electrons, and oxygen to water. Assuming the current densities mentioned, the direct current generated will be of sufficient value to be usefully employed. A similar procedure may be employed if a selective absorbent-aqueous reactant mixture is employed. The process of the invention, including regeneration, is preferably carried out continuously, and the cells may be employed in series.

The precise construction of the cell in this embodiment is a matter of choice. Generally, the anode and cathode will be separated by a barrier to prevent reduction of the oxidized polvalent metal chelate, etc., the barrier allowing hydrogen ion (but not oxygen) transmission. In such case, the hydrogen ion migrating to the cathode will react with the oxygen supplied to produce water, and provision will be made for water removal. Suitable barriers may be selected by those skilled in the art, and include porous or fibrous non-conductive inert materials containing or impregnated with the desired electrolyte. For example, asbestos cloth and microporous polyvinyl chloride may be employed. However, polymeric ion exchange membranes, which also function as electrolytes, may be used to separate the electrodes. For example, Nafion, a perfluorinated carbon polymer with pendant sulfonic groups, as described in IECEC '75 (Intersociety Energy Conversion Engineering Conference) Record, pages 210 through 216, is suitable. The cathodic half cell may be of any suitable type for reacting H+ ions with oxygen and electrons to produce water. The preferred cathodes utilized, i.e., suitable oxygen or air cathodes, are known and may be selected by those skilled in the art. For example, oxygen cathodes are described in U.S. Pat. No. 3,765,946 to Werner et al, and in the Proceedings of the 27th Power Sources Symposium (1976) by P.S.C. Publications, pages 175 through 177. Suitable electrode materials include hydro-phobic, teflon-bonded porous carbon with deposited platinum catalyst. As used herein, the term oxygen-containing gases, such as air or air-enriched with oxygen.

The particular type of gaseous stream treated is not critical, as will be evident to those skilled in the art. Streams particularly suited to removal of $H_2S$ and $CO_2$ by the practice of the invention are, as indicated, naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may also vary, but may range from about 0.1 percent to about 99 percent or greater by volume. Obviously, the amounts of $H_2S$ and $CO_2$ present are not generally a limiting factor in the practice of the invention.

The temperatures employed in the contacting or absorption-contact zone are not generally critical, except that the reaction is carried out below the melting point of sulfur, and, if an absorbent is used, the temperatures employed must permit acceptable absorption of $CO_2$. In many commerical applications, such as the removal of $H_2S$ and $CO_2$ from natural gas to meet pipeline specifications, absorption at ambient temperatures is desired, since the cost of refrigeration would exceed the benefits obtained due to increased absorption at the lower temperature. In general, temperatures from 10° C. to 80° C. are suitable, and temperatures from 20° C. to 45° C. are preferred. Contact times will range from about 1 second to about 270 seconds or longer, with contact times of 2 seconds to 120 seconds being preferred.

In the regeneration zone or zones, temperatures may be varied widely. Preferably, the regeneration zone should be maintained at substantially the same temperature as the contacting zone. In general, temperatures of from about 10° C. to 80° C., preferably 20° C. to 45° C., may be employed.

Pressure conditions in the contacting zone may vary widely. If the regeneration is carried out in the contacting zone, the pressure may vary up to the limitations of the electrolytic half cell. If the regeneration is carried out in a separate zone, pressures in the contacting zone may vary from one atmosphere up to one hundred fifty or even two hundred atmospheres, with pressures of from one atmosphere to about one hundred atmospheres being preferred. In the regeneration or desorption zone or zones, pressures also may be varied considerably, and will preferably range from about 0.5 atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251 to Meuly, issued Feb. 22, 1977, incorporated herein by reference. Preferably, if the iron chelate of nitrilotriacetic acid is used, pH in the process of the invention will be in the acid region, i.e., less than 7.

As indicated, the $H_2S$, when contacted, is rapidly converted in the process of the invention by the oxidizing polyvalent metal chelate or chelates of nitrilotriacetic acid to elemental sulfur. Since the polyvalent metal chelates have limited solubility in many solvents or absorbents, if an absorbent is used, the chelate or chelates are preferably supplied in admixture with the liquid absorbent and water. The amount of oxidizing polyvalent metal chelate or chelates supplied is an effective amount, i.e., an amount sufficient to convert all or substantially all of the $H_2S$ in the gas stream, and will generally be on the order of at least about one mol per mol of $H_2S$. Ratios of from about 2 mols to about 15 mols of polyvalent metal chelate per mol of $H_2S$ converted (basis polyvalent metal) may be used, with ratios of from about 2 mols per mol to about 5 mols of polyvalent metal chelate(s) per mol of $H_2S$ being preferred. The manner of preparing the admixture containing an absorbent is a matter of choice. For example, the polyvalent metal chelate or chelates may be added to the absorbent, and, if necessary, then water added. The amount of water added will normally be just that amount necessary to achieve solution of the chelate(s), and can be determined by routine experimentation. Since the polyvalent metal chelate(s) may have a significant solubility in the solvent, and since water is produced by the reaction of the $H_2S$ and the oxidizing polyvalent metal ions of the chelate or chelates, precise amounts of water to be added cannot be given. In the case of absorbents having a low solubility for the chelate(s), approximately 5 percent to 10 percent water by volume, based on the total volume of the absorbent mixture, will generally provide solvency. Preferably, however, the polyvalent metal chelate or chelates are added as an aqueous solution to the liquid absorbent. Where the reactant is supplied as an aqueous solution, the amount of solution supplied may be about 20 percent to about 80 percent by volume of the total absorbent admixture supplied to the absorption zone. An oxidizing polyvalent metal chelate solution will generally be supplied as an aqueous solution having a concentration of from about 0.1 molar to about 1 molar, and a concentration of about 1.0 molar is preferred. The ligand to metal molar ratio may range from 1.1 to 2.0, preferably 1.2 to 1.4.

As indicated, the oxidizing polyvalent metal chelates of nitrilotriacetic acid (NTA) are employed in the invention. Any oxidizing polyvalent metal chelate of NTA, or mixtures thereof, may be used, but those of iron, copper, and manganese are preferred, particularly iron. The polyvalent metal should be capable of oxidizing hydrogen sulfide, while being reduced itself from a higher to a lower valence state, and should then be oxidizable from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin.

The absorbents employed in this invention are those absorbents which have a high degree of selectivity in absorbing $CO_2$ (and preferably $H_2S$ as well) from the gaseous streams. Any of the known absorbents conventionally used which do not affect the activity of the ferric chelate, and which exhibit sufficient solubility for the reactant or reactants, may be employed. As indicated, the absorbent preferably has good absorbency for $H_2S$ as well, in order to assist in the removal of any $H_2S$ present in the gaseous streams. The particular absorbent chosen is a matter of choice, given these qualifications, and selection can be made by routine experimentation. For example, diethylene glycol mono ethyl-ether, propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art.

The manner of recovering the sulfur is a matter of choice. For example, the sulfur may be recovered by settling, filtration, liquid extraction or flotation, or by suitable devices, such as a hydroclone. Preferably, the sulfur is removed prior to regeneration.

In order to illustrate the invention, reference is made to the accompanying schematic drawing. Parameter values given herein are calculated or merely exemplary, and should not be taken as delimiting the invention.

FIG. 1 illustrates a combined sulfur removal-regeneration scheme;

FIG. 2 illustrates a preferred $H_2S$ removal process-oxygen regeneration system, and FIG. 3 illustrates a preferred electrode system.

In FIG. 1, sour natural gas containing, for example, 0.5 percent by weight of $H_2S$, based on the total weight of the gas, from line (1) enters contactor (2) via a sparger (3). The gas, preferably as fine bubbles, is contacted in contactor (2) with a 1.0 M solution of the ferric chelate of nitrilotriacetic acid. The $H_2S$ is immediately converted to sulfur and H+ ions, and ferric chelate of nitrilotriacetic acid is converted to ferrous chelate nitrilotriacetic acid. "Sweetened" natural gas passes overhead via line or outlet (4) to use or further treatment. Contactor (2) also contains a platinum anode (5) which is connected electrically through a load 6 to a cathode (7). Cathode (7) is an air cathode mounted opposite an opening in the wall of contactor (2) in such manner that it is in contact with a hydrogen-ion permeable membrane (8) which covers the opening. The membrane (8) preferably comprises a substance, such as Nafion, and the cathode, which may simply be a porous carbon coating on the membrane, preferably contains platinum particles. Adjoining contactor (2) is a chamber (10) through which an oxygen-containing gas, such as air, is passed in contact with the electrode.

As the reduced chelate is formed in solution, it is promptly oxidized at anode (5) by virtue of the difference in potential across the cell. Concomitantly, hydrogen ions migrate through the membrane to the porous carbon cathode, and react there with oxygen and electrons to form water. The water is removed via outlet (11). The procedure is preferably conducted continuously, sulfur-containing reactant solution being removed from the bottom of contactor (2), as shown, and passed via line (12) to filter (13) where sulfur is removed. After sulfur removal, the solution is returned via line (14) to contactor (2). Other means of sulfur removal may be employed. In theory, a useful voltage of 0.5 to 1 volt may be delivered to the load.

In FIG. 2, sour gas, e.g., natural gas containing about 0.5 percent $H_2S$, in line (1) enters contactor or column (2) (tray type) into which also enters an aqueous admixture comprising an aqueous 2.0 M solution of the Fe(III) chelate of nitrilotriacetic acid from line 12. The pressure of the feed gas is about 1200 p.s.i.g., and the temperature of the aqueous admixture is about 45° C. A contact time of about 120 seconds is employed in order to react all the $H_2S$. Purified or "sweet" gas leaves column (2) through line (3). The "sweet" gas is of a purity sufficient to meet standard requirements. In the admixture, the $H_2S$ is converted to elemental sulfur by the Fe(III) chelate, Fe(III) chelate in the process being converted to the Fe(II) chelate. The aqueous reactant admixture, containing the elemental sulfur, is removed continuously and sent through line (4) to a depressurization and degassing unit (5), and then to a separation zone. The separation zone (6) preferably comprises a unit, such as a filter, extraction unit, or centrifuge (6), for separating the bulk of the sulfur produced from the aqueous admixture. It is not necessary that all sulfur be removed from the admixture. Sulfur is removed via line (7), and may be further treated, as desired. Concomitantly, the aqueous admixture is removed via line (8) for regeneration of the ferrous chelate. If the aqueous admixture contains a solvent for $CO_2$, according to that embodiment of the invention, it may suitably be stripped at this point, or after regeneration (shown in dotted lines). If steam is used, the solution must be cooled before reuse.

To regenerate, the admixture in line (8) enters the anode section A of cell (9) where the reduced reactant, i.e., the Fe(II) chelate of nitrilotriacetic acid, is oxidized at a carbon or other suitable electrode to the Fe(III) chelate of nitrilotriacetic acid. Regenerated reactant mixture leaves section A via line (10), preferably to a holding tank (11), from whence it may be returned via line (12) to contactor (2). Section A is separated from cathode section C by a hydrogen ion permeable barrier B, for example, Nafion Section C receives $H^+$ ion from section A, and air from line 13. The air from line 13 contacts the $H^+$ ion in a porous carbon electrode, producing water. The connection of the half cells, externally as shown, produces a useful current flow. Those skilled in the art will recognize that this description of cell 9 is merely illustrative and that a multiple cell unit should, in fact, be employed. Such a cell stock is shown in FIG. 3.

More particularly, FIG. 3 illustrates a cell stack section which may be used in the invention. Each cell has a Nafion ionic membrane coated on both sides with porous carbon containing a small amount of platinum or other catalyst. The porous carbon, with the catalyst, serves as the electrode and the Nafion membrane allows hydrogen ions to migrate to the cathode. The admixture is passed through the anode cell space and air is passed through the cathode cell space.

In order to determine the suitability of the Ferric-Ferrous half cell for fuel cell operation, current density measurements were made utilizing a 2.5 $cm^2$ platinum anode. Ferric chelate of nitrilotriacetic acid was employed at concentrations of 1 and 2 weight percent, basis iron, respectively. At a voltage drop of 0.5 V, a current density of 250 $ma/cm^2$ was obtained with the 2 wt percent solution, and a current density of 150 $ma/cm^2$ was obtained with the 1 wt percent Fe solution. Based on these tests, it was concluded that the couple was suitable for fuel cell operation.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

What is claimed is:
1. A process for the removal of $H_2S$ from a sour gaseous stream comprising
    (a) contacting the sour gaseous stream in a contacting zone with an aqueous reaction solution at a temperature below the melting point of sulfur, the solution containing an effective amount of an oxidizing polyvalent metal chelate of nitrilotriacetic acid, and mixtures thereof, and producing a sweet gas stream and an aqueous admixture containing crystalline sulfur, hydrogen ions and reduced polyvalent metal chelate or chelates of nitrilotriacetic acid; said contacting zone comprising an anode section of an electrochemical cell, said electrochemical cell also comprising a separate cathode section containing a cathode connected through an external load to the anode, the anode section and cathode section being separated by a hydrogen ion permeable barrier;
    (b) oxidizing reduced polyvalent metal chelate or chelates of nitrilotriacetic acid at the anode in the aqueous reaction solution while concomitantly supplying oxygen to the cathode section and allowing hydrogen ions to migrate to the cathode section, and producing direct current through the load and water at the cathode;
    (c) removing sulfur from the aqueous reaction solution, and water from the cathode section.
2. A process for the removal of $H_2S$ from a sour gaseous stream comprising
    (a) contacting the sour gaseous stream in a contacting zone with an aqueous reaction solution at a temperature below the melting point of sulfur, the solution containing an effective amount of an oxidizing polyvalent metal chelate of nitrilotriacetic acid, and mixtures thereof, and producing a sweet gas stream and an aqueous admixture containing crystalline sulfur, hydrogen ions, and reduced polyvalent metal chelate or chelates of nitrilotriacetic acid;
    (b) removing sulfur from the aqueous admixture;
    (c) regenerating aqueous admixture from step (b) electrolytically by passing admixture from step (b) through the anode section of an electrochemical cell, said electrochemical cell also comprising a separate cathode section containing a cathode connected through an external load to the anode, the anode section and cathode section being separated by a hydrogen ion permeable barrier; and oxidizing reduced polyvalent metal chelate or chelates of nitrilotriacetic acid at the anode to produce a regenerated aqueous admixture containing regenerated oxidizing polyvalent metal chelate or chelates of nitrilotriacetic acid, while concomitantly supplying oxygen to the cathode section and allowing hydrogen ions to migrate to the cathode section, and producing direct current through said load and water at the cathode;
    (d) removing regenerated aqueous admixture from said anode section, and water from said cathode section; and
    (e) returning regenerated aqueous admixture to the contacting zone.
3. The process of claim 2 wherein the oxidizing polyvalent metal chelate of nitrilotriacetic acid is the ferric chelate of nitrilotriacetic acid.

4. The process of claim 1 wherein the aqueous reaction solution comprises a liquid absorbent selective for $CO_2$.

5. The process of claim 2 wherein the aqueous reaction solution comprises a liquid absorbent selective for $CO_2$.

6. The process of claim 3 wherein the aqueous reaction solution comprises a liquid absorbent selective for $CO_2$.

* * * * *